United States Patent
Turletti

[19]

[11] Patent Number: 6,076,888
[45] Date of Patent: Jun. 20, 2000

[54] MOTOR-VEHICLE SEAT HAVING A FRAME OF MAGNESIUM ALLOY, WITH MEANS FOR MOUNTING UPHOLSTERY RAPIDLY

[75] Inventor: Massimo Turletti, Turin, Italy

[73] Assignee: Lear Corporation Italia, Spa, Turin, Italy

[21] Appl. No.: 09/257,371

[22] Filed: Feb. 25, 1999

[30] Foreign Application Priority Data

Mar. 17, 1998 [IT] Italy .................................. TO98A0231

[51] Int. Cl.[7] .................................................. A47C 31/02
[52] U.S. Cl. .................................. 297/218.3; 297/218.2; 297/218.5; 297/452.59
[58] Field of Search ........................... 297/218.1, 218.2, 297/218.3, 218.5, 228.13, 452.18, 452.59

[56] References Cited

U.S. PATENT DOCUMENTS

| | | | |
|---|---|---|---|
| 4,370,002 | 1/1983 | Koepke | 297/218.1 X |
| 4,465,534 | 8/1984 | Zelkowitz | 297/218.1 X |
| 4,715,651 | 12/1987 | Wakamatsu | 297/218.1 |
| 5,671,976 | 9/1997 | Fredrick | 297/452.18 |
| 5,954,395 | 9/1999 | Moulins | 297/218.5 X |

FOREIGN PATENT DOCUMENTS 3737878  5/1988  Germany  .......................... 297/218.2

*Primary Examiner*—Peter R. Brown
*Attorney, Agent, or Firm*—Syghrue, Mion, Zinn, Macpeak & Seas, PLLC

[57] ABSTRACT

A motor-vehicle seat comprises a backrest having a frame of magnesium alloy defining a peripheral cavity within which there is fitted a peripheral portion of the padding of foamed plastic material of the backrest. The outer wall of the frame of magnesium alloy acts as an aesthetic trim surface of the seat, whereas the cover of the padding is hooked on a metal insert embedded within the padding. The rear surface of the padding is hidden from view by a flexible covering panel which is also rapidly connected to the frame.

4 Claims, 2 Drawing Sheets

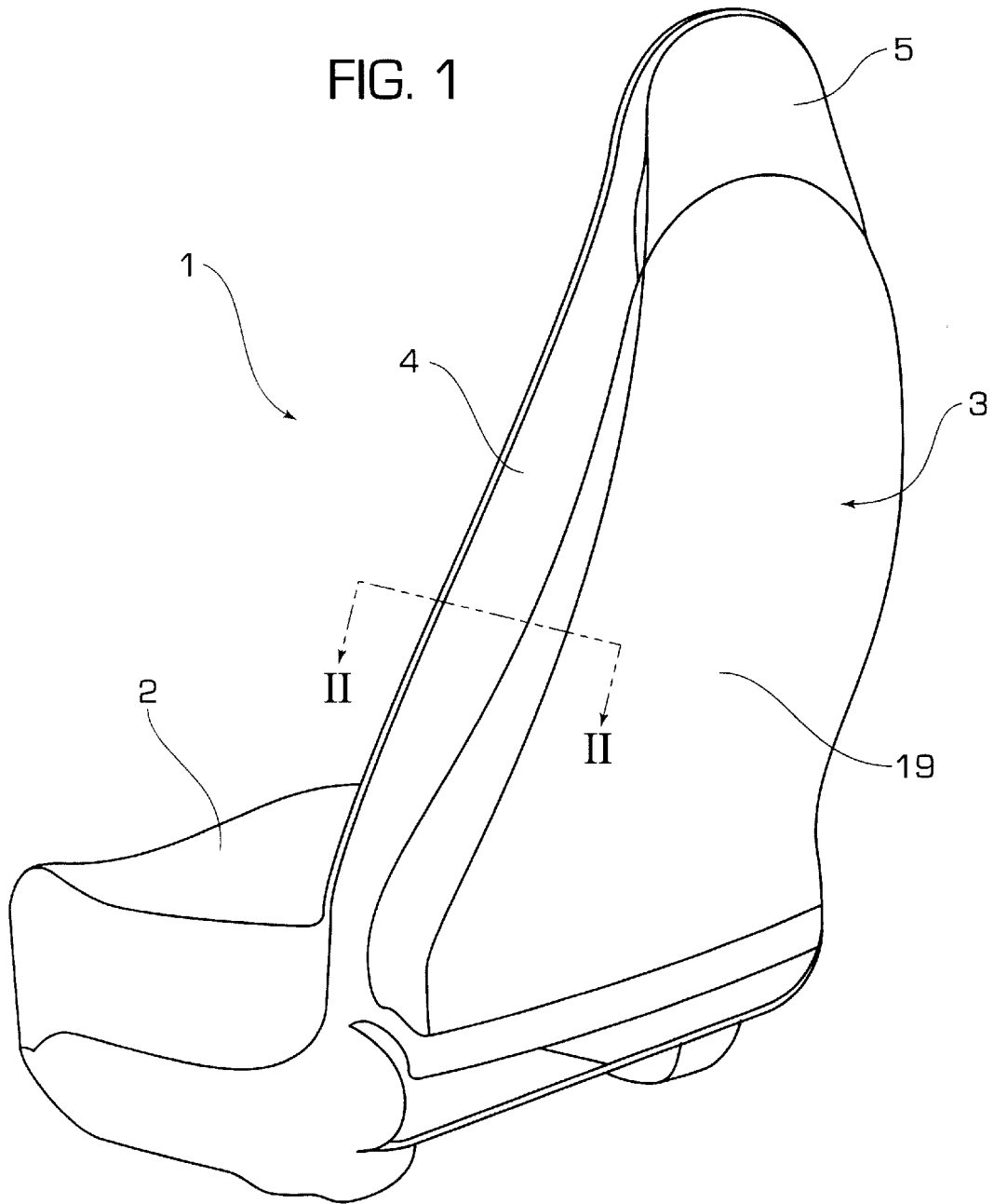

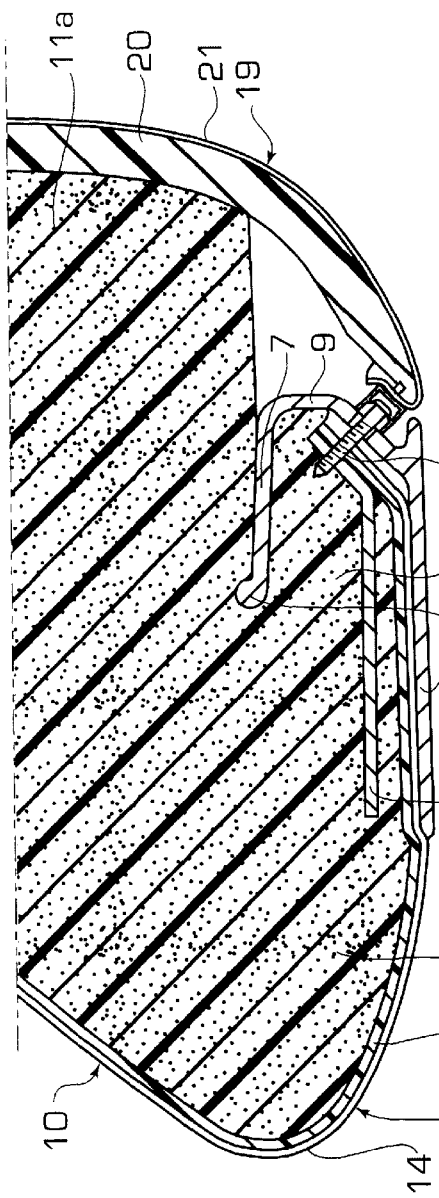
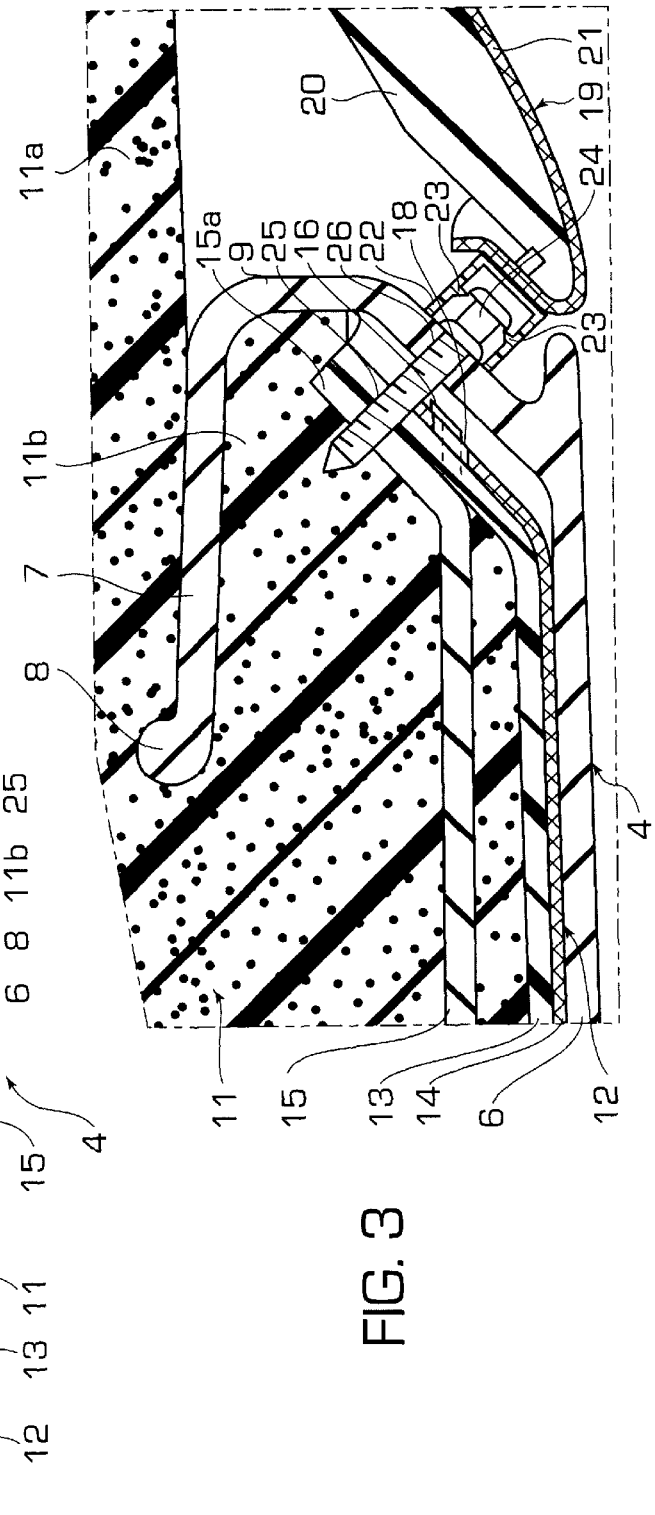

MOTOR-VEHICLE SEAT HAVING A FRAME OF MAGNESIUM ALLOY, WITH MEANS FOR MOUNTING UPHOLSTERY RAPIDLY

BACKGROUND OF THE INVENTION

The present invention relates to motor-vehicle seats of the type comprising a backrest having a frame of light alloy, particularly of magnesium alloy, with a generally U-shaped structure, including two side uprights connected at the top by a cross member, and a padding secured to the frame, constituted by a body of foamed plastic material provided with a cover.

SUMMARY

The object of the present invention is that of providing a seat of the above indicated type which on one hand enables the operation of applying the padding to the seat frame to be performed easily and rapidly and on the other hand makes use of the frame of light alloy also as an aesthetic trim element of the seat.

In view of achieving this object, the invention provides a seat of the type indicated at the beginning of the present description, characterized in that the above mentioned side uprights and the above mentioned upper cross member of the frame of the backrest have a C-shaped cross-section having a cavity facing forwardly, and the padding of foamed plastic material has a peripheral portion fitted within the cavity defined by said C-shaped cross-section, said peripheral portion of the padding being further provided with a rigid insert embedded therewithin having a portion projecting outwardly which defines a plurality of engaging elements, the cover of the padding being arranged within the cavity defined by said C-shaped cross-section and having one edge provided with slots for coupling with said engaging elements.

Due to the above mentioned features, the padding of foamed plastic material can be rapidly connected to the frame of the backrest by fitting its peripheral portion within the cavity defining at the front of the side uprights and the upper cross member of the frame. The cover associated with the padding can then be secured to the frame and tensioned by coupling the slots provided on its peripheral edge over the engaging elements formed by said rigid insert embedded within the peripheral portion of the padding. The outer peripheral surface of the frame of the backrest remains then visible and acts as an aesthetical trim surface for the seat, which feature is allowed by the use of a light alloy and particularly of a magnesium alloy, in the manufacture of the frame.

According to a further preferred feature of the invention, in order to hide from view the rear surface of the padding which occupies the space between the two side uprights of the frame, said surface is covered with a flexible covering panel, constituted by a mat of foamed plastic material with an associated cover. The frame and said rear flexible covering panel are provided with means for quick mutual coupling. Preferably, these means include a plurality of coupling members projecting rearwardly from the frame, as well as a profile having a C-shaped cross-section secured along the periphery of the flexible covering panel and adapted to be snap-engaged on said coupling members.

In a preferred embodiment, said coupling members serving for securing the rear flexible covering panel are constituted by the heads of screws projecting from the frame and screwed into said rigid insert.

BRIEF DESCRIPTION OF THE DRAWINGS

Further features and advantages of the invention will become apparent from the following description with reference to the annexed drawings, given purely by way of non limiting example, in which:

FIG. 1 is a perspective rear view of a preferred embodiment of a seat according to the invention, FIG. 2 is a view in cross section taken along line II—II of FIG. 1, and FIG. 3 is a view at an enlarged scale of a detail of FIG. 2.

DETAILED DESCRIPTION OF THE INVENTION

With reference to the drawings, numeral 1 generally designates a motor-vehicle seat comprising a cushion 2 and a backrest 3. The backrest 3 includes a frame of magnesium alloy having a generally U configuration, defined by two side uprights 4 (only one of which is visible in the drawings) and an upper cross member 5 connecting the two side uprights 4.

As clearly shown in FIGS. 2, 3, each of the two uprights 4 and the cross member 5 have a C-shaped cross-section with an outer wall 6, an inner wall 7, which in the illustrated example ends with an enlarged bead 8, having a rounded cross-section, and a bottom wall 9.

The backrest 3 comprises a padding 10 constituted, in a way known per se, by a body 11 of foamed plastic material provided with a cover 12 which, according to the prior art, is made by a layer of foamed plastic material 13 secured to a cover 14, such as a fabric.

The padding 11 comprises a central portion 11a which occupies the space defined between the two side uprights 4 and the upper cross member 5, and a peripheral portion 11b which is fitted within the cavity defined by the C-shaped cross-section of uprights 4 and cross member 5.

As clearly apparent from the drawings, within the peripheral portion 11b of the body 11 of foamed plastic material there is embedded a rigid insert 15, such as of metal material, having a portion 15a projecting out of the body 11 of foamed plastic material and provided with a plurality of teeth 16, for example formed by cutting and bending, in the case the insert 15 is constituted by metal material, distributed throughout the whole peripheral extension of portion 11.

The upholstery of the seat is applied easily and rapidly by fitting the peripheral portion 11b of the padding 11 within the peripheral cavity 16 defined by the side uprights 4 and the cross member 5 and coupling the peripheral edge of the fabric 14, which to this end is provided with a number of slots 18, on the teeth 16. In this manner, the fabric 14 can be secured to the frame of the seat while keeping the body 11 of foamed plastic material locked in position and tensioning the cover 12.

As shown, the cover 12 is introduced within the cavity 17 of the frame, so that the outer surface of the outer wall 6 of the frame acts also as an aesthetic trim surface. This possibility is available since the seat frame is preferably made of magnesium alloy.

The rear surface of the central portion 11a of the body 11 of foamed plastic material is hidden from view by a rear flexible covering panel 19 which comprises a mat 20 of foamed plastic material provided with a covering fabric 21. Along the peripheral edge of the rear flexible covering panel 19 there is secured (e.g. stitched) a profile of plastic material 22 having a C-shaped cross-section which is clearly visible in FIG. 3, with two inner projecting edges 23.

Peripherally along the frame of the backrest there are provided coupling members constituted by the heads 24 of self-tapping screws 25, which are inserted through holes 26 of the bottom wall 9 of the frame and are screwed into the rigid insert 15. The profile 22 can be snap mounted over the heads 24 due to the engagement of the latter beyond the inner projecting edges 23 of the profile 22.

From the foregoing description, it is clearly apparent that the seat according to the invention is characterized by the possibility of applying the padding to the frame of the seat with very easy and rapid operations and further has unique aesthetical features, since it makes use of the outer surface of the frame, which is advantageously made of magnesium alloy, as an aesthetical trim surface of the seat.

Naturally, while the principle of the invention remains the same, the details of construction and the embodiments may widely vary with respect to what has been described and illustrated purely by way of example.

What is claimed is:

1. Motor-vehicle seat, comprising a backrest having a frame of light alloy, particularly of magnesium alloy, with a generally U-shaped structure, with two side uprights connected at the top by a cross member, and a padding secured to the frame, made by a body of foamed plastic material provided with a cover, wherein said side uprights and said cross-member have a C-shaped cross-section with a cavity facing forwardly, and the padding of foamed plastic material has a peripheral portion fitted within the cavity defined by said C-shaped cross-section of the uprights and the cross member, said peripheral portion of the padding being provided with a rigid insert embedded therein and secured to said frame, said insert having outwardly projecting portions defining a plurality of engaging elements, the cover of the padding being arranged within the cavity of the frame and having one edge provided with slots for coupling with said engaging elements.

2. Seat according to claim 1, wherein the rear surface of the padding is covered by a flexible covering panel including a mat of foamed plastic material provided with a cover, said frame and said rear flexible panel being provided with means for quick mutual coupling.

3. Seat according to claim 2, wherein said quick mutual coupling means comprise a plurality of coupling members projecting rearwardly from the frame and a profile having a C-shaped cross-section secured along the periphery of said rear flexible panel and adapted to be snap-engaged on said coupling members.

4. Seat according to claim 3, wherein said coupling members for connection of the rear flexible panel are defined by the heads of a plurality of screws arranged through holes formed in the frame and screwed into said rigid insert adjacent said engaging elements.

* * * * *